(12) United States Patent
Nazarpoor et al.

(10) Patent No.: US 10,253,669 B2
(45) Date of Patent: Apr. 9, 2019

(54) APPLICATION OF SYNERGIZED-PGM WITH ULTRA-LOW PGM LOADINGS AS UNDERFLOOR THREE-WAY CATALYSTS FOR INTERNAL COMBUSTION ENGINES

(71) Applicant: Clean Diesel Technologies, Inc., Oxnard, CA (US)

(72) Inventors: Zahra Nazarpoor, Camarillo, CA (US); Stephen J. Golden, Santa Barbara, CA (US); Maxime Launois, Massy (FR)

(73) Assignee: CDT Advanced Materials, Inc., Oxnard, CA (US)

( * ) Notice: Subject to any disclaimer, the term of this patent is extended or adjusted under 35 U.S.C. 154(b) by 37 days.

(21) Appl. No.: 15/586,823

(22) Filed: May 4, 2017

(65) Prior Publication Data

US 2017/0328249 A1 Nov. 16, 2017

Related U.S. Application Data

(60) Provisional application No. 62/335,165, filed on May 12, 2016.

(51) Int. Cl.
*F01N 3/00* (2006.01)
*F01N 3/10* (2006.01)
(Continued)

(52) U.S. Cl.
CPC ......... *F01N 3/101* (2013.01); *B01D 53/9445* (2013.01); *B01D 53/9468* (2013.01);
(Continued)

(58) Field of Classification Search
CPC .... B01J 23/005; B01J 2523/828; B01J 23/40; B01J 37/0248; B01D 2255/20761;
(Continued)

(56) References Cited

U.S. PATENT DOCUMENTS 4,274,981 A * 6/1981 Suzuki ................. B01D 53/945
423/213.5
6,276,132 B1* 8/2001 Kanesaka .......... B01D 53/9431
60/286

(Continued)

FOREIGN PATENT DOCUMENTS

DE 102011010104 A1 * 8/2011 ............. B01J 23/30

OTHER PUBLICATIONS

English Translation of DE 102011010104 A1.*

*Primary Examiner* — Binh Q Tran
*Assistant Examiner* — Anthony Ayala Delgado
(74) *Attorney, Agent, or Firm* — Thaddius J. Carvis

(57) ABSTRACT

Synergized platinum group metals (SPGM) with ultra-low PGM loadings employed as underfloor (UF) three-way catalyst (TWC) systems with varied material compositions and configurations are disclosed. SPGM UF catalysts in which ZPGM compositions of binary and ternary spinel structures supported onto support oxides are coupled with commercialized PGM close-coupled (CC) catalysts and tested under Federal Test Procedure FTP-75 within TGDI and PI engines. The performance of the TWC systems including commercialized PGM CC and SPGM UF (with ultra-low PGM loadings) catalysts is compared to the performance of commercialized PGM CC and PGM UF catalysts. The disclosed TWC systems indicate that SPGM UF TWC catalytic performance is comparable or even exceeds high PGM-based conventional TWC catalysts, with reduced tailpipe emissions.

7 Claims, 13 Drawing Sheets

(51) Int. Cl.
  *B01J 23/00* (2006.01)
  *B01D 53/94* (2006.01)
  *F01N 13/00* (2010.01)
  *B01J 37/02* (2006.01)
  *B01J 23/889* (2006.01)
  *B01J 23/89* (2006.01)
  *B01J 35/00* (2006.01)

(52) U.S. Cl.
  CPC ........ *B01D 53/9477* (2013.01); *B01J 23/005* (2013.01); *B01J 23/8892* (2013.01); *B01J 23/8986* (2013.01); *B01J 37/0244* (2013.01); *F01N 13/009* (2014.06); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/2073* (2013.01); *B01D 2255/20761* (2013.01); *B01D 2255/405* (2013.01); *B01D 2255/904* (2013.01); *B01D 2255/9022* (2013.01); *B01D 2258/01* (2013.01); *B01J 35/0006* (2013.01); *B01J 2523/00* (2013.01); *F01N 2370/02* (2013.01); *F01N 2510/068* (2013.01); *Y02T 10/22* (2013.01)

(58) Field of Classification Search
  CPC ...... B01D 2255/405; B01D 2255/1025; B01D 2255/207
  See application file for complete search history.

(56) References Cited

U.S. PATENT DOCUMENTS

| | | | |
|---|---|---|---|
| 6,497,851 B1* | 12/2002 | Hu | B01D 53/944 422/171 |
| 2013/0236380 A1* | 9/2013 | Golden | F01N 3/101 423/213.2 |
| 2014/0271387 A1* | 9/2014 | Nazarpoor | B01J 23/8892 422/170 |
| 2014/0274674 A1* | 9/2014 | Nazarpoor | B01J 23/8892 502/302 |

* cited by examiner

300

APPLICATION OF SYNERGIZED-PGM WITH ULTRA-LOW PGM LOADINGS AS UNDERFLOOR THREE-WAY CATALYSTS FOR INTERNAL COMBUSTION ENGINES

CROSS REFERENCE TO RELATED APPLICATIONS

The present application claims priority to U.S. Provisional Application No. 62/335,165, filed May 12, 2016, the contents of which is hereby incorporated by reference in its entirety.

BACKGROUND

Field of the Disclosure

The present disclosure relates generally to three-way catalyst (TWC) systems, and more particularly, to synergized-PGM TWC catalysts with ultra-low PGM loadings employed in underfloor configurations for reduction of emissions from engine exhaust systems.

Background Information

Three-way catalyst (TWC) systems continue to be implemented as the primary emission control strategy for internal combustion engines within vehicles. However, a period of rapidly evolving production road maps for engine/combustion improvements that are tied to energy efficiency has recently begun by the automotive industry. Associated catalytic improvements will need to go beyond the fine tuning of platinum group metals (PGM) usage and rare earth (RE) metals used as oxygen storage materials (OSM) and will present important challenges to catalyst developers.

The trend toward more stringent tailpipe regulations, noted from the global tightening of the light and heavy duty emission standards, have led to important improvements in the development of modern catalysts including: improved fuel economy and reduction of greenhouse gas emissions requirements that establish lower exhaust temperatures; and material supply issues related to the supply and demand of PGM materials as a result of their availability and price volatility. As changes in the formulation of catalysts continue to increase the cost of TWC systems, the need for catalysts of significant catalytic performance has directed efforts toward the development of catalytic materials capable of providing the required synergies to achieve greater catalytic performance. Additionally, compliance with ever stricter environmental regulations, and the need for lower manufacturing costs require new types of TWC systems. Therefore, there is a continuing need to provide TWC systems, employing reduced amounts of PGM catalyst materials and that are free of RE metals, which exhibit catalytic properties substantially similar to or exceeding the catalytic properties exhibited by conventional TWC systems employing standard amounts of PGM catalyst materials and RE metals.

SUMMARY

The present disclosure describes three-way catalyst (TWC) systems including synergized ultra-low platinum group metals (PGM) loadings underfloor (UF) catalysts. The ultra-low PGM loadings UF catalysts within the TWC systems are synergized with Zero-PGM (ZPGM) catalyst material compositions comprising spinel oxide materials. The catalyst material compositions within the ZPGM layers of the SPGM UF catalysts include binary or ternary spinel structures (e.g., Cu—Mn or Cu—Co—Mn spinel compositions) supported onto support oxides. The catalyst material compositions within the PGM layers include variable platinum (Pt)/palladium (Pd)/rhodium (Rh) with ultra-low concentrations within a range of about 1 g/ft$^3$ to about 10 g/ft$^3$ supported onto support oxides.

In some embodiments, a variety of TWC systems are configured to assess their catalytic performance by measuring tailpipe emissions according to the U.S. Federal Test Procedure (FTP-75) protocol. In these embodiments, the TWC systems are configured to include commercially available standard close-coupled (CC) catalysts and SPGM (with ultra-low PGM) UF catalysts. Further to these embodiments, the configured TWC systems, including the SPGM UF catalysts, are mechanically coupled to and in fluidic communication with an internal combustion engine, such as, for example a Tier 2 bin 4 turbo gasoline direct injection (TGDI) engine or a naturally aspirated port-injection (PI) engine, amongst others, for emission certification testing according to FTP-75 protocol.

In other embodiments, a standard TWC system is configured with commercially available high PGM-based OEM CC and OEM UF catalysts as reference catalytic system. In these embodiments, the standard TWC system is mechanically coupled to and in fluidic communication with substantially similar engines used for testing the aforementioned TWC systems including ultra-low loading SPGM UF catalysts according to FTP-75 protocol.

In further embodiments, prior to emission testing according to FTP-75 protocol, the OEM CCC, OEM UF, and SPGM UF catalysts within the TWC systems are aged on an engine bench employing a standard multi-mode aging cycle at bed temperatures of about 1000° C. and 900° C. for 50 hours, respectively for CC and UF catalysts.

In some embodiments, catalytic efficiency of UF SPGM catalyst measured downstream at the tailpipe (weighted bag results) for the aforementioned TWC systems is assessed according to FTP-75 protocol and further compared with the weighted emissions measured for the UF high PGM OEM catalysts.

In one embodiment, the disclosure is directed to a catalytic system for treating an exhaust stream of a combustion engine, comprising a combustion engine; a close-coupled catalytic converter configured to accept at least one exhaust gas stream from the combustion engine, wherein the close-coupled catalytic converter comprising a platinum group metal catalyst; and an underfloor catalytic converter downstream of, and, in fluid communication with said close-coupled catalytic converter, the underfloor catalytic converter comprising a synergized platinum group metal catalyst comprising a spinel catalyst composition and an ultra-low platinum group metal catalyst, wherein the platinum group metal catalyst has a concentration of about 1 g/ft$^3$ to about 5 g/ft$^3$.

In some embodiments, the close-coupled catalytic converter comprises a platinum group metal catalyst having a platinum group metal having a platinum group metal loading from about 90 to 110 g/ft$^3$. Preferably, the platinum group metal of the close-coupled catalytic converter is selected from the group consisting of platinum, palladium, ruthenium, iridium, and rhodium, and even more preferably, the platinum group metal catalyst comprises a combination of platinum and rhodium.

In some embodiments, the close-coupled catalytic converter comprises a platinum group metal catalyst having a platinum group metal having a platinum group metal loading from about 20 to 50 g/ft$^3$, and the underfloor catalytic converter comprises a synergized platinum group metal catalyst comprising a spinel catalyst composition and an ultra-low platinum group metal catalyst having a platinum group metal catalyst concentration of about 1 g/ft$^3$ to about 10 g/ft$^3$.

In one embodiment, the spinel catalyst composition comprises a binary spinel having the general formula $A_xB_{3-x}O_4$ wherein X is from 0.01 to 2.99, and A and B are selected from the group consisting of sodium, potassium, calcium, barium, zinc, cadmium, aluminum, magnesium, manganese, nickel, copper, cobalt, iron, chromium, titanium, cerium, strontium, lanthanum, praseodymium, neodymium, samarium, indium, and mixtures thereof. For example, in one embodiment the binary spinel comprises a Cu—Mn spinel, and in particular, a Cu—Mn spinel having the formula $Cu_{1.5}Mn_{1.5}O_4$.

In other embodiments, the spinel catalyst composition comprises a catalyst composition comprising a spinel oxide having the formula $A_XB_YM_{3-X-Y}$ where X is from about 0.01 to about 1.99 and Y is from about 0.01 to about 1.0, and wherein A, B, and M are different from each other, and are selected from the group consisting of sodium, potassium, calcium, barium, zinc, cadmium, aluminum, magnesium, manganese, nickel, copper, cobalt, iron, chromium, titanium, cerium, strontium, lanthanum, praseodymium, neodymium, samarium, indium, and mixtures thereof.

In one embodiment, the spinel oxide has the formula $Cu_XCo_YMn_{3-X-Y}O_4$ where X is from about 0.01 to about 1.99 and Y is from about 0.01 to about 1.0, such as an embodiment in which X is about 1.0 and Y is about 1.0.

In some embodiments, the spinel catalyst composition is supported onto a support oxide selected from the group consisting of $Al_2O_3$, doped $Al_2O_3$, $ZrO_2$, doped $ZrO_2$, $SiO_2$, doped $SiO_2$, $TiO_2$, doped $TiO_2$, doped $Al_2O_3$—$ZrO_2$, $Nb_2O_5$, and mixtures thereof.

In one embodiment, the spinel catalyst composition is deposited onto a substrate as a washcoat layer, and the ultra-low platinum group metal catalyst is deposited onto the washcoat layer as an overcoat layer.

An example of a suitable substrate on which the spinel catalyst composition is deposited is a ceramic, such as cordierite.

In one embodiment, the catalytic system of claim 5, wherein the platinum group metal of the ultra-low platinum group metal catalyst is selected from the group consisting of platinum, palladium, ruthenium, iridium, and rhodium. For example, the platinum group metal of the ultra-low platinum group metal catalyst may comprise a combination of platinum and rhodium.

In some embodiments, the close-coupled catalytic converter comprises a platinum group metal catalyst having a platinum group metal having a platinum group metal loading from about 90 to 110 g/ft$^3$, and the underfloor catalytic converter comprises a synergized platinum group metal catalyst comprising a spinel catalyst composition and an ultra-low platinum group metal catalyst having a platinum group metal catalyst concentration of about 1 g/ft$^3$ to about 10 g/ft$^3$.

In another embodiment, the close-coupled catalytic converter comprises a platinum group metal catalyst having a platinum group metal having a platinum group metal loading from about 20 to 50 g/ft$^3$, and the underfloor catalytic converter comprises a synergized platinum group metal catalyst comprising a spinel catalyst composition and an ultra-low platinum group metal catalyst having a platinum group metal catalyst concentration of about 1 g/ft$^3$ to about 10 g/ft$^3$.

Preferably, the platinum group metal catalyst of the synergized platinum group metal catalyst is free of rare earth metals and oxygen storage materials.

Advantageously, embodiments of the catalytic system exhibit reductions in tailpipe emissions of $NO_X$, CO, and THC in comparison to a similar system having a platinum group metal catalyst as the underfloor catalytic converter in lieu of a synergized platinum group metal catalyst.

Embodiments of the invention are also directed to methods of treating an exhaust stream of a combustion engine. For example, in one embodiment, a method is provided for removing pollutants from an exhaust stream of a combustion engine, comprising introducing an exhaust stream of the combustion engine into a close-coupled catalytic converter comprising a platinum group metal catalyst to thereby at least partially catalytically convert $NO_X$, CO, and THC; and introducing the at least partially catalytically converted exhaust stream into a underfloor catalytic converter comprising a synergized platinum group metal catalyst comprising a spinel catalyst composition and an ultra-low platinum group metal catalyst, wherein the platinum group metal catalyst has a concentration of about 1 g/ft$^3$ to about 10 g/ft$^3$.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

(as described above), and employing a TGDI engine at given speeds, according to an embodiment.

Figure 9:
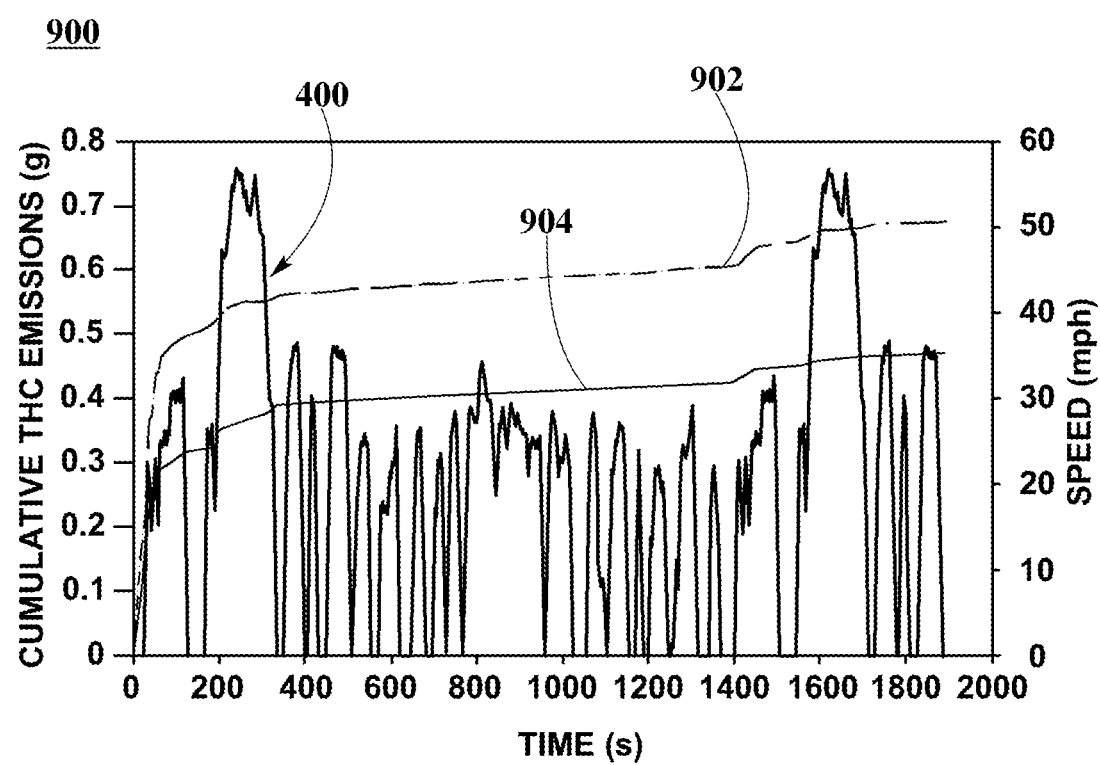

FIG. 9 is a graphical representation illustrating cumulative tailpipe THC emission results for TWC systems 1 and 2 (as described above), and employing a TGDI engine at given speeds, according to an embodiment.

Figure 4:
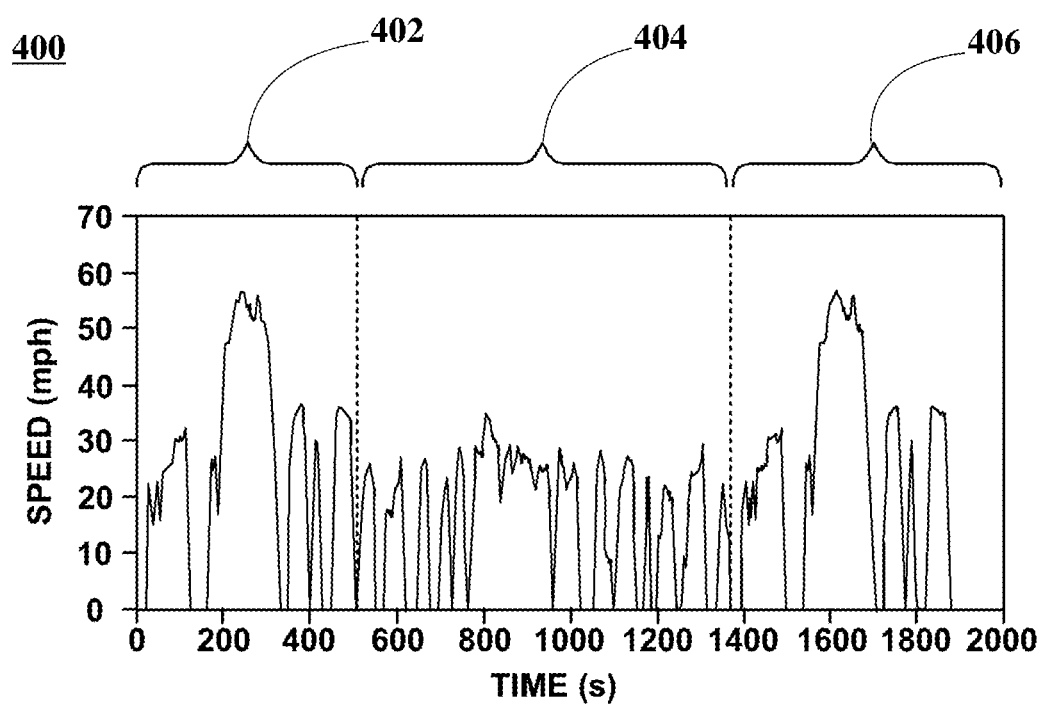
FIG. 4 is a graphical representation illustrating driving phases of the U.S Federal Test Procedure (FTP-75) employed for testing, measuring, and diagnosing catalytic performance of TWC systems as described in FIGS. 1 and 2, according to an embodiment.
Figure 10:
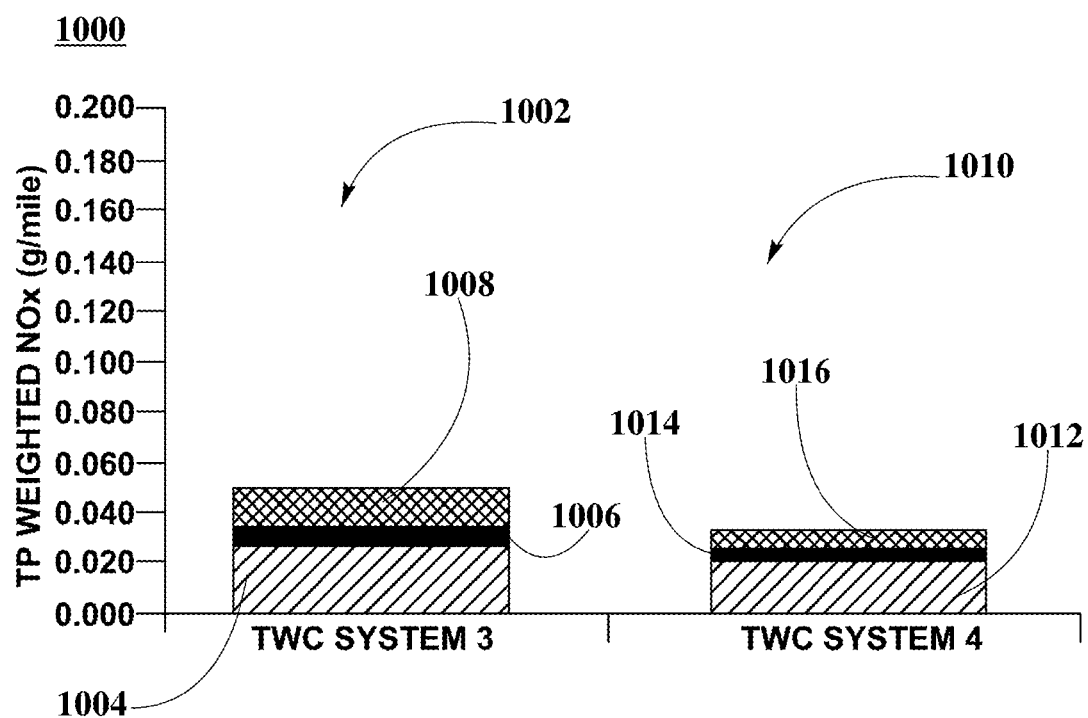

FIG. 10 is a graphical representation illustrating weighted $NO_X$ (g/mile) values at tailpipe for TWC systems 3 and 4 (as described above) employed within a naturally aspirated port injection (PI) engine using FTP-75 test protocol as described in FIG. 4, according to an embodiment.

Figure 11:
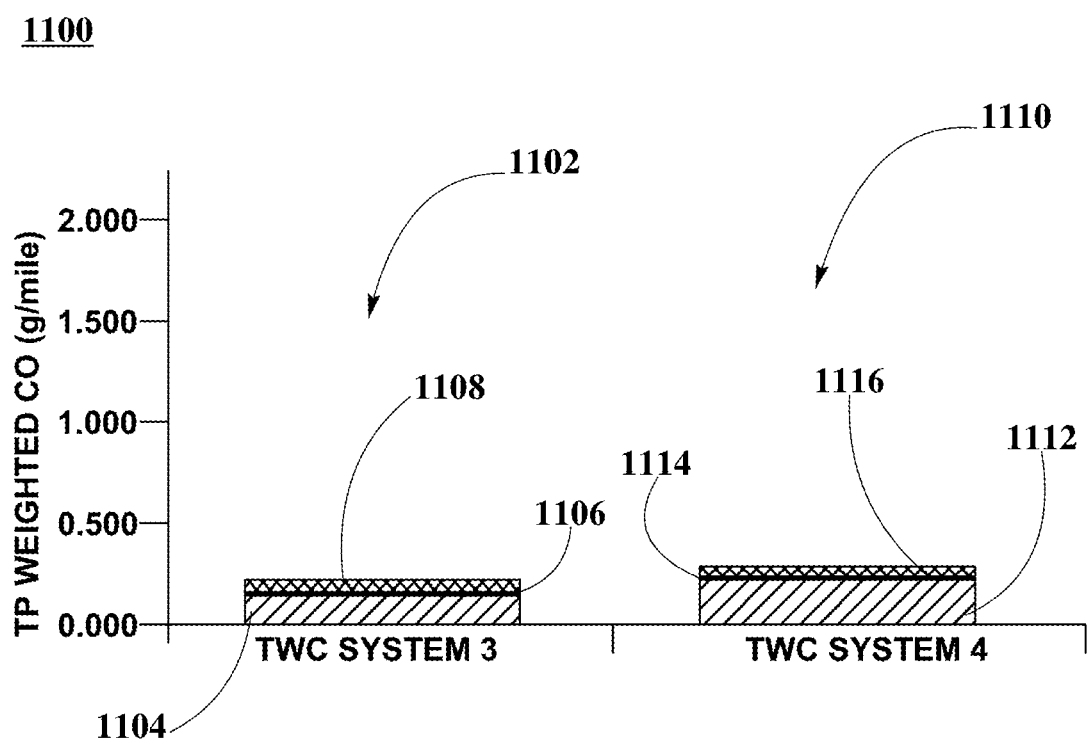

FIG. 11 is a graphical representation illustrating weighted CO (g/mile) values at tailpipe for TWC systems 3 and 4 (as described above) employed within a PI engine using FTP-75 test protocol as described in FIG. 4, according to an embodiment.

Figure 12:
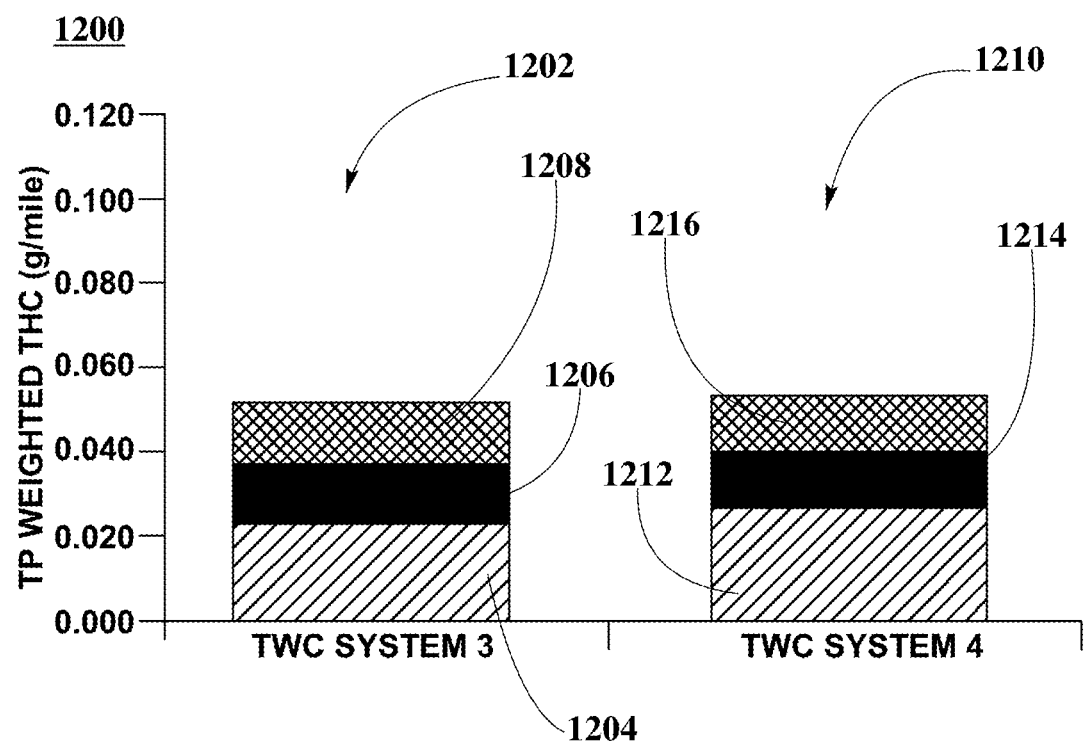

FIG. 12 is a graphical representation illustrating weighted THC (g/mile) values at tailpipe for TWC systems 3 and 4 (as described above) employed within a PI engine using FTP-75 test protocol as described in FIG. 4, according to an embodiment.

Figure 13:
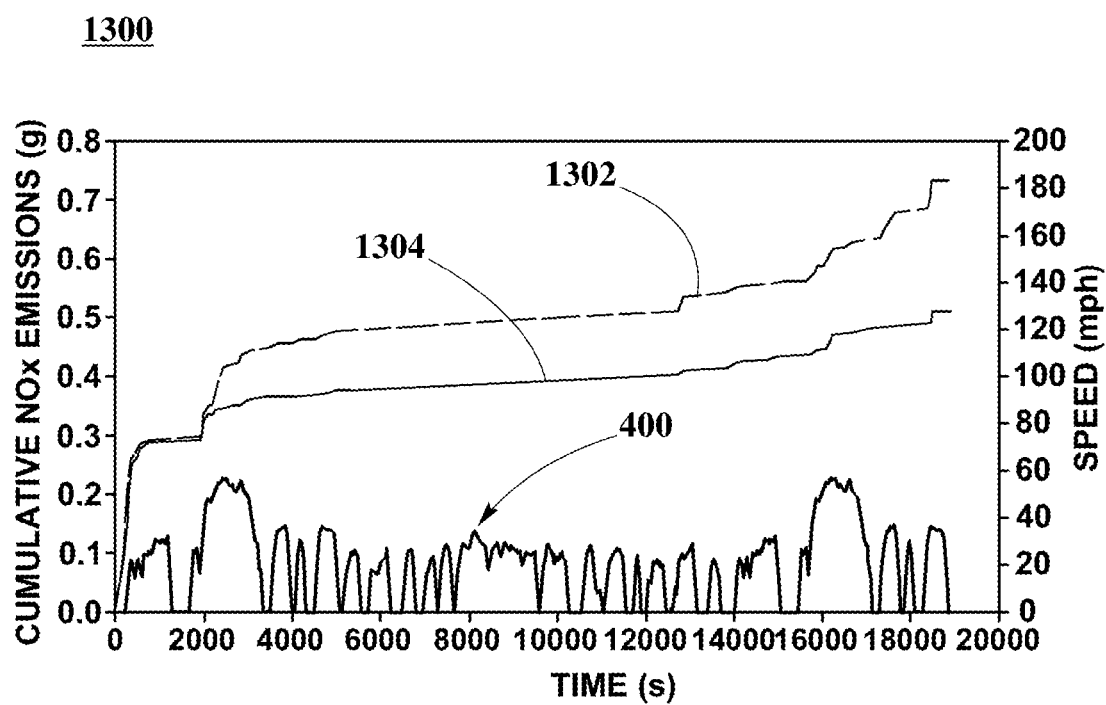

FIG. 13 is a graphical representation illustrating cumulative tailpipe $NO_X$ emission results for TWC systems 3 and 4 (as described above), and employing a PI engine at given speeds, according to an embodiment.

DETAILED DESCRIPTION

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

Definitions

As used here, the following terms have the following definitions:

"Air-to-fuel ratio (AFR)" refers to the mass ratio of air to fuel present in a combustion process such as in an internal combustion engine.

"Calcination" refers to a thermal treatment process applied to solid materials, in presence of air, to bring about a thermal decomposition, phase transition, or removal of a volatile fraction at temperatures below the melting point of the solid materials.

"Catalyst" refers to one or more materials that may be of use in the conversion of one or more other materials.

"Catalytic converter" refers to a vehicle emissions control device that converts toxic pollutants in exhaust gas to less toxic pollutants by catalyzing a redox reaction (oxidation, reduction, or both).

"Catalyst system" refers to any system including a catalyst, such as a PGM catalyst or a ZPGM catalyst of at least two layers comprising a substrate, a washcoat and/or an overcoat.

"Close-coupled (CC) catalyst" refers to a catalyst located in close proximity to the engine's exhaust manifold.

"Conversion" refers to the chemical alteration of at least one material into one or more other materials.

"U.S. Federal Test Procedure (FTP) emission test" refers to emission certification testing procedure of light-duty vehicles in the United States.

"Impregnation" refers to the process of imbuing or saturating a solid layer with a liquid compound or the diffusion of some element through a medium or substance.

"Incipient wetness (IW)" refers to the process of adding solution of catalytic material to a dry support oxide powder until all pore volume of support oxide is filled out with solution and mixture goes slightly near saturation point.

"Lambda" refers to a ratio of actual air-to-fuel ratio to a stoichiometric air-to-fuel ratio.

"Milling" refers to the operation of breaking a solid material into a desired grain or particle size.

"Original Equipment Manufacturer (OEM)" refers to a manufacturer of a new vehicle or a manufacturer of any part or component that is originally installed in a new vehicle's certified emission control system.

"Overcoat (OC) layer" refers to a catalyst layer of at least one coating that can be deposited onto at least one washcoat layer or impregnation layer.

"Platinum group metals (PGM)" refers to platinum, palladium, ruthenium, iridium, osmium, and rhodium.

"Spinel" refers to any minerals of the general formulation $AB_2O_4$ where the A ion and B ion are each selected from mineral oxides, such as, for example magnesium, iron, zinc, manganese, aluminum, chromium, titanium, nickel, cobalt, or copper, amongst others.

"Substrate" refers to any material of any shape or configuration that yields a sufficient surface area for depositing a washcoat layer and/or an overcoat layer.

"Support oxide" refers to porous solid oxides, typically mixed metal oxides, which are used to provide a high surface area that aids in oxygen distribution and exposure of catalysts to reactants, such as, for example $NO_X$, CO, and hydrocarbons.

"Synergized-PGM (SPGM) catalyst" refers to a PGM catalyst system that is synergized by a ZPGM compound employing different catalyst configurations.

"Three-way catalyst (TWC)" refers to a catalyst that performs the three simultaneous tasks of reduction of nitrogen oxides to nitrogen and oxygen, oxidation of carbon monoxide to carbon dioxide, and oxidation of unburnt hydrocarbons to carbon dioxide and water.

"Underfloor (UF) catalyst" refers to a catalyst that is incorporated into the exhaust system of a motor vehicle, typically located beneath the floor of a vehicle, mechanically coupled downstream to a close-coupled (CC) catalyst.

"Washcoat (WC) layer" refers to a catalyst layer of at least one coating, including at least one oxide solid that can be deposited onto a substrate.

"Zero-PGM (ZPGM) catalyst" refers to a catalyst completely or substantially free of platinum group metals (PGM).

Description of the Disclosure

The present disclosure describes synergized platinum group metals (SPGM) underfloor (UF) three-way catalysts that are produced having a catalyst configuration that includes an ultra-low PGM composition synergized with a spinel-based ZPGM composition, which is free of rare-earth (RE) metals compositions. These SPGM UF catalysts are incorporated within engine systems as components of TWC converters that are part of TWC systems for controlling and reducing engine exhaust emissions. The conversion performance of these TWC systems is assessed and compared using the driving phases described in the U.S. Federal Test Procedure (FTP-75) protocol (2014).

TWC System Configuration

Figure 1:
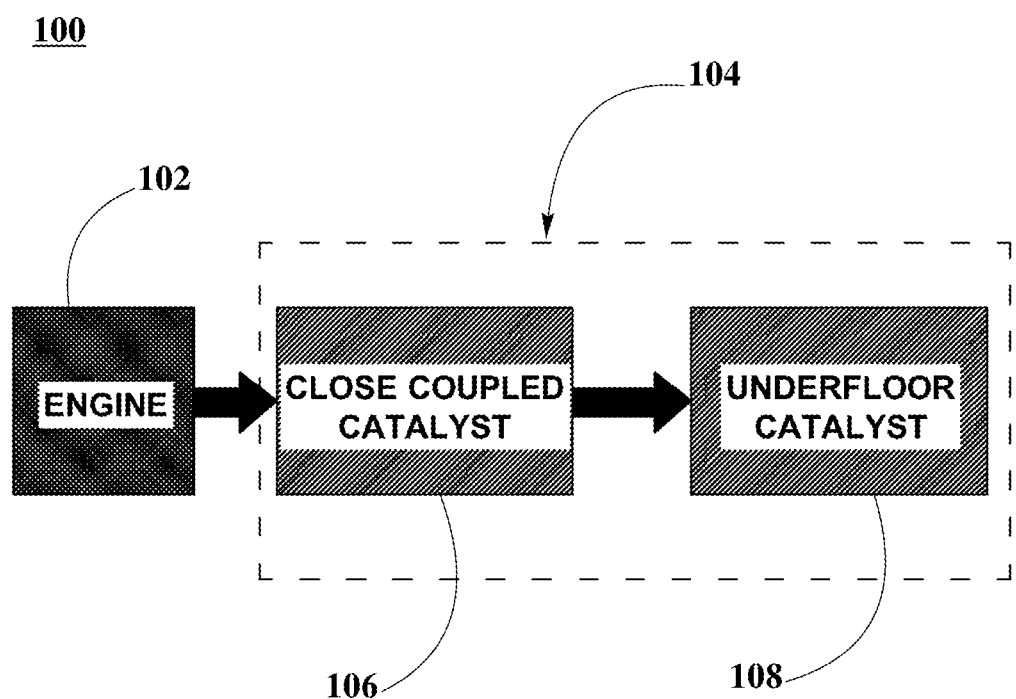
FIG. 1 is a graphical representation illustrating a configuration for three-way catalyst (TWC) systems including close-coupled (CC) and underfloor (UF) catalysts, according to an embodiment.

FIG. 1 is a graphical representation illustrating a configuration for three-way catalyst (TWC) systems including close-coupled (CC) and underfloor (UF) catalysts, according to an embodiment. In FIG. 1, engine system 100 includes engine 102 and TWC system 104. TWC system 104 further includes close-coupled (CC) catalyst 106 and underfloor (UF) catalyst 108. In FIG. 1, engine 102 is mechanically coupled to and in fluidic communication with TWC system 104. In TWC system 104, CC catalyst 106 is mechanically coupled to and in fluidic communication with UF catalyst 108.

In some embodiments, CC catalyst 106 is implemented as a PGM commercialized catalyst including a high PGM loading. In these embodiments, UF catalyst 108 is implemented as either a PGM commercialized catalyst including a high PGM loading or as a SPGM catalyst including ultra-low PGM loadings. Further to these embodiments, engine 102 can be implemented as an internal combustion engine employed within a motor vehicle, such as, for example a Tier 2 bin 4 turbo gasoline direct injection (TGDI) engine or a naturally aspirated port-injection (PI) engine, amongst others. In these embodiments, a variety of TWC systems can be configured to assess and compare the catalytic performance when employed with engine 102.

TWC System 1

In some embodiments, TWC system 104, herein referred to as TWC system 1, is implemented including a high PGM-based original equipment manufacturer (OEM) CC and OEM UF catalysts. In these embodiments, CC catalyst 106 is a high PGM-based OEM CC catalyst with a PGM loading of about 98 g/ft$^3$ palladium (Pd) and about 8 g/ft$^3$ rhodium (Rh), resulting in a total PGM loading of about 106 g/ft$^3$ and a substrate having a volume of about 1.7 L. Further to these embodiments, UF catalyst 108 is a high PGM-based OEM UF catalyst with a PGM loading of about 51 g/ft$^3$ Pd and about 8 g/ft$^3$ Rh, resulting in a total PGM loading of about 59 g/ft$^3$ and a substrate having a volume of about 1.3 L.

TWC System 2

In some embodiments, TWC system 104, herein referred to as TWC system 2, is implemented including a high PGM-based OEM CC catalyst as described previously above in TWC system 1 and a SPGM UF catalyst with ultra-low PGM loadings, herein referred to as SPGM UF Type 1 catalyst. In these embodiments, OF catalyst 108 is a SPGM UF Type 1catalyst that includes a spinel-based ZPGM layer, coated with an ultra-low PGM layer of about 1 g/ft$^3$ platinum (Pt) and about 1 g/ft$^3$ Rh, resulting in a total PGM loading of about 2 g/ft$^3$.

TWC System 3

In some embodiments, TWC system 104, herein referred to as TWC system 3, is implemented including a commercially available PGM-based CC catalyst and a SPGM UF catalyst with ultra-low PGM loadings, herein referred to as SPGM UF Type 2 catalyst. In these embodiments, CC catalyst 106 is a PGM-based CC catalyst with a PGM loading of about 22.2 g/ft$^3$ Pd and about 4.3 g/ft$^3$ Rh, resulting in a total PGM loading of about 26.5 g/ft$^3$ with a substrate having a volume of about 1.08 L. Further to these embodiments, OF catalyst 108 is a SPGM UF Type 2 catalyst that includes spinel-based ZPGM layer, coated with an ultra-low PGM layer of about 1 g/ft$^3$ Pt and about 1 g/ft$^3$ Rh, resulting in a total PGM loading of about 2 g/ft$^3$.

TWC System 4

In some embodiments, TWC system 104, herein referred to as TWC system 4, is implemented including a commercially available PGM-based OEM CC as described previously above in TWC system 3 and a SPGM UF catalyst, herein referred to as SPGM UF Type 3catalyst. In these embodiments, OF catalyst 108 is a SPGM UF Type 3 catalyst that includes spinel-based ZPGM layer, coated with an ultra-low PGM layer of about 5 g/ft$^3$ Pt and about 5 g/ft$^3$ Rh, resulting in a total PGM loading of about 10 g/ft$^3$.

Although the above discussions with respect to the PGM in the CC and UF catalysts of TWC systems 1-4 only describe using Pt and Rh, it should be recognized that one or more other platinum group metals may be used in accordance with embodiments of the invention, including palladium, ruthenium, iridium, and osmium.

In some embodiments, TWC system 1 and TWC system 2 are mechanically coupled to and in fluidic communication with a TGDI engine used for testing the aforementioned TWC systems. In other embodiments, TWC system 3 and TWC system 4 are mechanically coupled to and in fluidic communication with a PI engine used for testing the aforementioned TWC systems.

SPGM UF Catalyst Configuration

In some embodiments, SPGM UF catalyst includes a substrate, a washcoat (WC) layer coated onto the substrate, and an overcoat (OC) layer coated onto the WC layer. In these embodiments, a PGM composition is implemented as an OC layer. Further to these embodiments, a ZPGM composition is implemented as a WC layer. Still further to these embodiments, different combinations of ZPGM and PGM compositions provide different interactions between the ZPGM WC layer and the PGM OC layer within the SPGM UF catalyst configuration.

Material Composition of ZPGM Layer Employed Within SPGM UF Catalysts

In some embodiments, a ZPGM composition employed within the WC layer includes binary spinel structures with a general formulation $A_XB_{3-X}O_4$ in which X is a variable for molar ratios within a range from about 0.01 to about 2.99. In these embodiments, A and B can be implemented as Na, K, Mg, Ca, Sr, Ba, Cr, Mn, Fe, Co, Ni, Cu, Zn, Cd, Al, Ti, Ce, La, In, or mixtures thereof, amongst others. Further to these embodiments, the binary spinel structures are supported onto support oxides. Examples of support oxides include alumina ($Al_2O_3$), doped $Al_2O_3$, zirconia ($ZrO_2$), doped $ZrO_2$, doped $Al_2O_3$—$ZrO_2$, $TiO_2$, $Nb_2O_5$, $SiO_2$, or mixtures thereof, amongst others.

In an example, the ZPGM composition employed within the WC layer is implemented as a binary spinel structure of copper (Cu) and manganese (Mn). In this example, the Cu—Mn spinel structure is produced using a general formulation $Cu_XMn_{3-X}O_4$ spinel in which X takes a value of about 1.5 for a $Cu_{1.5}Mn_{1.5}O_4$ binary spinel structure. Further to this example, the $Cu_{1.5}Mn_{1.5}O_4$ binary spinel structure is supported onto a doped $Al_2O_3$—$ZrO_2$ support oxide powder.

In other embodiments, a ZPGM composition employed within the WC layer includes ternary spinel structures with a general formulation $A_XB_YM_{3-X-Y}O_4$ in which X is a variable for different molar ratios within a range from about 0.01 to about 1.99, and Y is a variable for different molar ratios within a range from about 0.01 to about 1.0. In these embodiments, A, B, and M can be implemented as Na, K, Mg, Ca, Sr, Ba, Cr, Mn, Fe, Co, Ni, Cu, Zn, Cd, Al, Ti, Ce, La, In, or mixtures thereof, amongst others. Further to these embodiments, the ternary spinel structures are supported onto support oxides. Examples of support oxides include alumina ($Al_2O_3$), doped $Al_2O_3$, zirconia ($ZrO_2$), doped $ZrO_2$, doped $Al_2O_3$—$ZrO_2$, $TiO_2$, $Nb_2O_5$, $SiO_2$, or mixtures thereof, amongst others.

In an example, the ZPGM composition employed within the WC layer is implemented as a ternary spinel structure of copper (Cu), cobalt (Co), and manganese (Mn). In this example, the Cu—Co—Mn spinel structure is produced using a general formulation $Cu_XCo_YMn_{3-X-Y}O_4$ spinel in which X and Y take a value of about 1.0, respectively, for a CuCoMnO$_4$ ternary spinel structure. Further to this example, CuCoMnO$_4$ ternary spinel structure is supported onto a doped Al$_2$O$_3$—ZrO$_2$ support oxide powder.

Material Composition of PGM Layer Employed Within SPGM UF Catalysts

In some embodiments, a PGM composition employed within the OC layer includes platinum (Pt), palladium (Pd), ruthenium (Ru), iridium (Ir), and rhodium (Rh), either by themselves, or in combinations thereof employing different loadings. In these embodiments, the PGM composition includes Pt/Rh with substantially similar loadings within a range from about 1 g/ft$^3$ to about 10 g/ft$^3$ supported onto a support oxide. Further to these embodiments, the PGM composition is free of rare-earth (RE) metals or any oxygen storage materials (OSM). In an example, the PGM composition employed within the OC layer includes PGM loadings of about 1 g/ft$^3$ Pt and about 1 g/ft$^3$ Rh supported onto a doped alumina support oxide powder. In another example, the PGM composition employed within the OC layer includes PGM loadings of about 5 g/ft$^3$ Pt and about 5 g/ft$^3$ Rh supported onto a doped alumina support oxide powder.

SPGM UF Catalyst Configuration and Production

Figure 2:
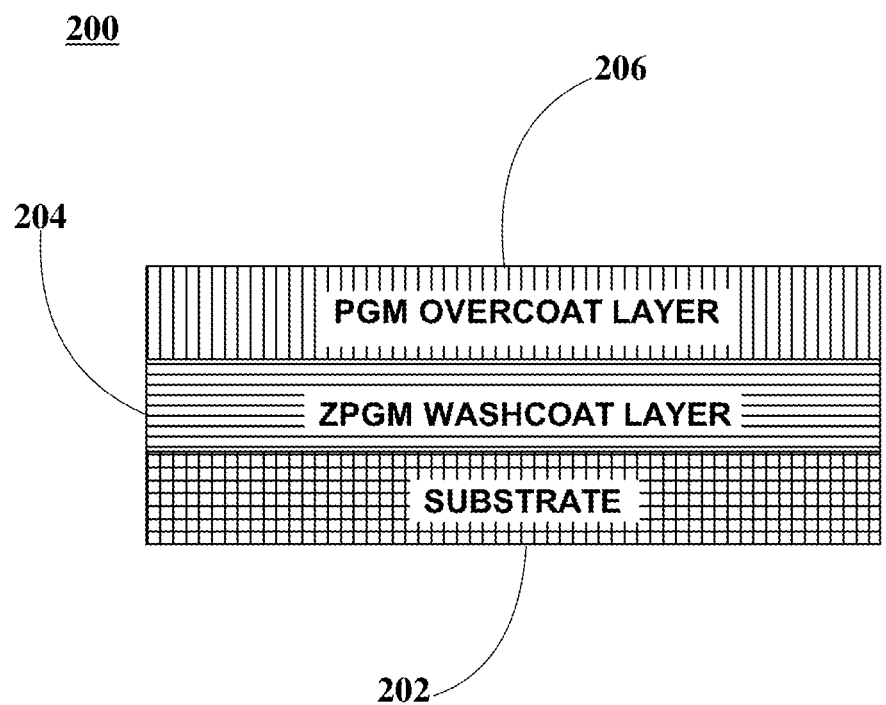
FIG. 2 is a graphical representation illustrating a catalyst configuration of a synergized-PGM (SPGM) catalyst for UF applications, according to an embodiment.

FIG. 2 is a graphical representation illustrating a catalyst configuration of a synergized-PGM (SPGM) catalyst for UF applications, according to an embodiment. In FIG. 2, catalyst configuration 200 includes substrate 202, ZPGM WC layer 204, and PGM OC layer 206. In some embodiments, ZPGM WC layer 204 is coated onto substrate 202. In these embodiments, PGM OC layer 206 is coated onto ZPGM WC layer 204.

In some embodiments, the ZPGM layer can be produced by employing any conventional catalyst synthesis methodologies. In these embodiments, the ZPGM layer is produced from powder comprising Cu—Mn binary spinel and doped Al$_2$O$_3$—ZrO$_2$. Further to these embodiments, the preparation of powdered Cu—Mn spinel and support oxide begins with the mixing of an appropriate amount of Mn nitrate solution and Cu nitrate solution at an appropriate molar ratio that results in Cu$_{1.5}$Mn$_{1.5}$O$_4$. Still further to these embodiments, the Cu—Mn nitrate solution is then drop-wise added to the doped Al$_2$O$_3$—ZrO$_2$ (alumina-zirconia) support oxide powder via incipient wetness (IW) methodology. In these embodiments, the Cu—Mn/doped Al$_2$O$_3$—ZrO$_2$ support oxide powder is then dried at about 120° C. overnight and further calcined at a temperature within a range from about 600° C. to about 850° C. for about 5 hours. Further to these embodiments, the calcined material of Cu—Mn binary spinel and doped Al$_2$O$_3$—ZrO$_2$ support oxide powder is subsequently ground into fine grain powder, and further milled with water to produce a slurry. Still further to these embodiments, said slurry is coated onto the substrate and further dried and calcined at a temperature of about 650° C. from about 4 hours to about 5 hours to produce ZPGM WC layer 204.

In other embodiments, the ZPGM layer is produced from powder comprising Cu—Co—Mn ternary spinel and doped Al$_2$O$_3$—ZrO$_2$. In these embodiments, the preparation of powdered Cu—Co—Mn spinel and support oxide begins with the mixing of an appropriate amount of Cu nitrate solution, Co nitrate solution, and Mn nitrate solution to at an appropriate molar ratio that results in CuCoMnO$_4$. Further to these embodiments, the Cu—Co—Mn nitrate solution is then drop-wise added to the doped Al$_2$O$_3$—ZrO$_2$ support oxide powder. Still further to these embodiments, the Cu—Co—Mn/doped Al$_2$O$_3$—ZrO$_2$ support oxide powder is then dried at about 120° C. overnight and further calcined at a temperature within a range from about 600° C. to about 850° C. for about 5 hours. In these embodiments, the calcined material of Cu—Co—Mn ternary spinel and doped Al$_2$O$_3$—ZrO$_2$ support oxide powder is subsequently ground into fine grain powder, and further milled with water to produce a slurry. Further to these embodiments, said slurry is coated onto the substrate and further dried and calcined at a temperature of about 650° C. for about 5 hours to produce ZPGM WC layer 204.

In a first example, a SPGM UF catalyst, herein referred to as SPGM UF Type 1 catalyst, is produced including a ceramic substrate, such as, for example a 400/3.0 1.29920 L substrate having a diameter (D) of 118.4 mm and a length (L) of 118.0 mm. Further to this example, the SPGM UF catalyst includes a ZPGM WC layer comprising a Cu—Mn binary spinel structure and doped Al$_2$O$_3$—ZrO$_2$ support oxide, as previously described above, and a PGM OC layer including Pt and Rh. In this example, the production of the PGM OC layer begins with the preparation of a mixed solution of Pt nitrate and Rh nitrate including PGM loadings of about 1 g/ft$^3$ Pt and about 1 g/ft$^3$ Rh. Further to this example, the doped alumina support oxide is milled separately and metallized with the Pt—Rh mixed nitrate solution to produce a slurry of PGM/doped alumina. Still further to this example, the slurry of PGM/doped alumina is coated onto the ZPGM WC layer, and further dried and calcined at a temperature of about 550° C. for about 4 hours to produce the SPGM UF Type 1 catalyst.

In a second example, a SPGM UF catalyst, herein referred to as SPGM UF Type 2 catalyst, is produced including a ceramic substrate, such as, for example 400/3.5 0.875 L substrate having a diameter (D) of 105.7 mm and a length (L) of 99.7 mm. Further to this example, the SPGM UF catalyst includes a ZPGM WC layer comprising CuCoMnO$_4$ ternary spinel structure and doped Al$_2$O$_3$—ZrO$_2$ support oxide, as previously described above, and a PGM OC layer including Pt and Rh. In this example, the production of the PGM OC layer begins with the preparation of a solution of Pt nitrate and Rh nitrate including PGM loadings of about 1 g/ft$^3$ Pt and about 1 g/ft$^3$ Rh in a mixture of doped alumina support oxide. Further to this example, the doped alumina support oxide is milled separately and metallized with the Pt—Rh mixed nitrate solution to produce a slurry of PGM/doped alumina. Still further to this example, the slurry of PGM/doped alumina is coated onto the ZPGM WC layer, and further dried and calcined at a temperature of about 550° C. for about 4 hours to produce the SPGM UF Type 2 catalyst.

In a third example, a SPGM UF catalyst, herein referred to as SPGM UF Type 3 catalyst, is produced including substantially similar substrate and ZPGM WC layer as described above for SPGM UF Type 2 catalyst. Further to this example, the production of the PGM OC layer begins with the preparation of a solution of Pt nitrate and Rh nitrate including PGM loadings of about 5 g/ft$^3$ Pt and about 5 g/ft$^3$ Rh in a mixture of doped alumina support oxide. Further to this example, the doped alumina support oxide is milled separately and metallized with the Pt—Rh mixed nitrate solution to produce a slurry of PGM/doped alumina. Still further to this example, the slurry of PGM/doped alumina is coated onto the ZPGM WC layer, and further dried and calcined at a temperature of about 550° C. for about 4 hours to produce the SPGM UF Type 3 catalyst.

In some embodiments, as previously described above, SPGM UF Type 1, 2, and 3 catalysts are implemented as the SPGM UF catalysts within TWC systems 2, 3, and 4, respectively.

Multi-Mode Aging Cycle Procedure

In some embodiments and prior to emission testing according to FTP-75, aforementioned CC and UF catalysts within the TWC systems 1, 2, 3, and 4 are aged under a standard multi-mode aging cycle on an engine bench. In these embodiments, the CC catalysts are aged under the multi-mode aging condition at a bed temperature of about 1000° C. for about 50 hours. Further to these embodiments, the UF (PGM-based and SPGM) catalysts are aged under the multi-mode aging condition at a bed temperature of about 900° C. for about 50 hours.

Figure 3:
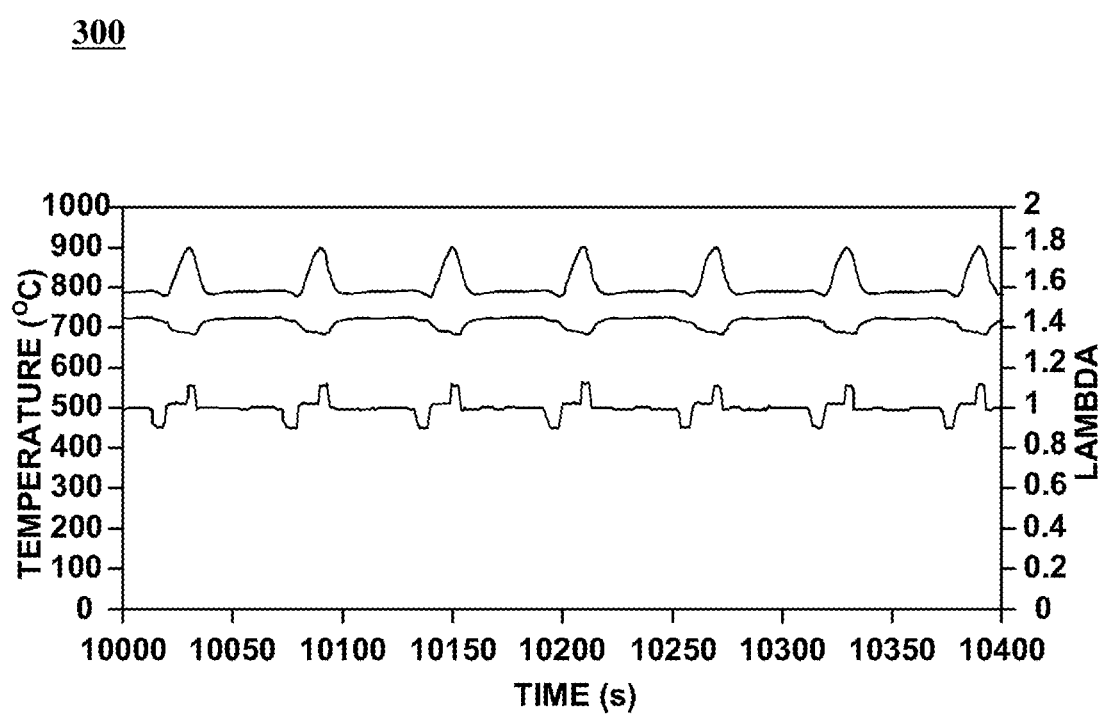
FIG. 3 is a graphical representation illustrating a standard multi-mode aging cycle protocol employed for engine bench aging of SPGM UF catalysts, according to an embodiment.

FIG. 3 is a graphical representation illustrating a standard multi-mode aging cycle protocol employed for engine bench aging of SPGM UF catalysts, according to an embodiment. In FIG. 3, multi-mode aging cycle 300 illustrates the aging procedure for the aforementioned SPGM UF catalysts.

In some embodiments, the multi-mode aging cycle procedure includes four segments. In these embodiments, aging segment 1 is performed employing an exhaust gas flow with a stoichiometric fuel-air ratio (AFR) and flowrate of about 80 SCFM (standard cubic feet per minute) per catalytic converter for a time duration of about 40 seconds. Further to these embodiments, aging segment 2 is performed employing an exhaust gas flow with a rich AFR and a flowrate of about 80 SCFM for a time duration of about 6 seconds. Still further to these embodiments, aging segment 3 is performed employing an exhaust gas flow with a rich AFR and further employing a secondary air injection flow for a time duration of about 10 seconds, thereby producing chemical reaction-induced thermal excursions (exotherms) having a brick temperature controlled at about 40 mm at a temperature of about 900° C. within±20° C. In these embodiments, aging segment 4 is performed employing an exhaust gas flow with a stoichiometric AFR with further employing a secondary air injection flow for a time duration of about 4 seconds.

U.S. Federal Test Procedure (FTP-75)

FIG. 4 is a graphical representation illustrating driving phases of the U.S Federal Test Procedure (FTP-75) employed for testing, measuring, and diagnosing catalytic performance of TWC systems as described in FIGS. 1 and 2, according to an embodiment. In FIG. 4, FTP-75 protocol 400 includes cold start phase 402, stabilized phase 404, and hot start phase 406.

In some embodiments, cold start phase 402 illustrates a phase of FTP-75 testing to measure tailpipe emissions and performance of the aforementioned TWC systems. In these embodiments, said driving phase is a cold start transient phase at ambient temperature of about 20° C. to about 30° C. performed for a time duration from zero to 505 seconds. Further to these embodiments, stabilized phase 404 illustrates a phase for driving conditions from about 506 seconds to about 1372 seconds performed after cold start phase 402. Still further to these embodiments and after stabilized phase 404 is finished, the engine is stopped for about 10 minutes and then hot start phase 406 begins. In these embodiments, hot start phase 406 illustrates two segments of driving conditions performed after stabilized phase 404 as follows: (1) a hot soak performed for a minimum time duration of about 540 seconds or a maximum time duration of about 660 seconds, and (2) a hot start transient phase performed for a time duration from zero to about 505 seconds. Further to these embodiments, tailpipe emissions from each phase are collected in a separate bag, analyzed, and expressed in g/mile.

Test Engines and Engine Specifications for Implementation of the FTP-75 Test

In some embodiments and referring to FIG. 1, engine 102 is implemented as a TGDI engine with an electronically controlled twin-scroll turbocharger, dual overhead camshaft (DOHC) engine with continuously variable valve timing in which direct injection is performed employing a cam-driven high pressure fuel pump. In these embodiments, the TGDI engine includes a two-stage variable displacement oil pump, an air-to-air intercooling system, and a cast aluminum engine block. Major specifications of the TGDI engine are illustrated in Table 1, below.

TABLE 1

| TGDI engine specifications. | | |
|---|---|---|
| SPECIFICATION | UNIT | VALUE |
| Displacement | cm³ | 1,998.0 |
| Compression Ratio | | 9.5:1 |
| Max. Torque | lb-ft | 295.0 @ 3,000-4,000 rpm |
| Power | HP | 259.0 |

In other embodiments and referring to FIG. 1, engine 102 is implemented as a PI engine with a die-cast aluminum engine block having 16 valves with dual variable valve timing (VVT-i), low friction technologies including an offset crankshaft and a valve train with roller rockers, three-stage variable oil pump, reduced-tension piston rings and an auxiliary belt drive. In these embodiments, the PI engine includes an acoustic control induction system that switches the length of the intake tract between two stages, based on RPM and throttle angle, to ensure a strong torque across a broad engine speed range. Further to these embodiments, the PI engine includes new tumble control valves that enhance combustion while the engine is cold and help to bring catalytic converters up to working temperature quickly. Still further to these embodiments, the tumble control valves, along with new 12-hole high atomizing long-nozzle fuel injectors, reduce the amount of fuel adhering to the intake ports to maximize fuel economy and reduce harmful emissions. Major specifications of the PI engine are illustrated in Table 2, below.

TABLE 2

| PI engine specifications. | | |
|---|---|---|
| SPECIFICATION | UNIT | VALUE |
| Displacement | cm3 | 2,494.0 |
| Compression Ratio | | 10.4:1 |
| Max. Torque | lb-ft | 170.0 @ 4,100 rpm |
| Power | HP | 178.0 |

Tailpipe Weighted Emission Bag Results from FTP-75 Test—TGDI Engine

Figure 5:
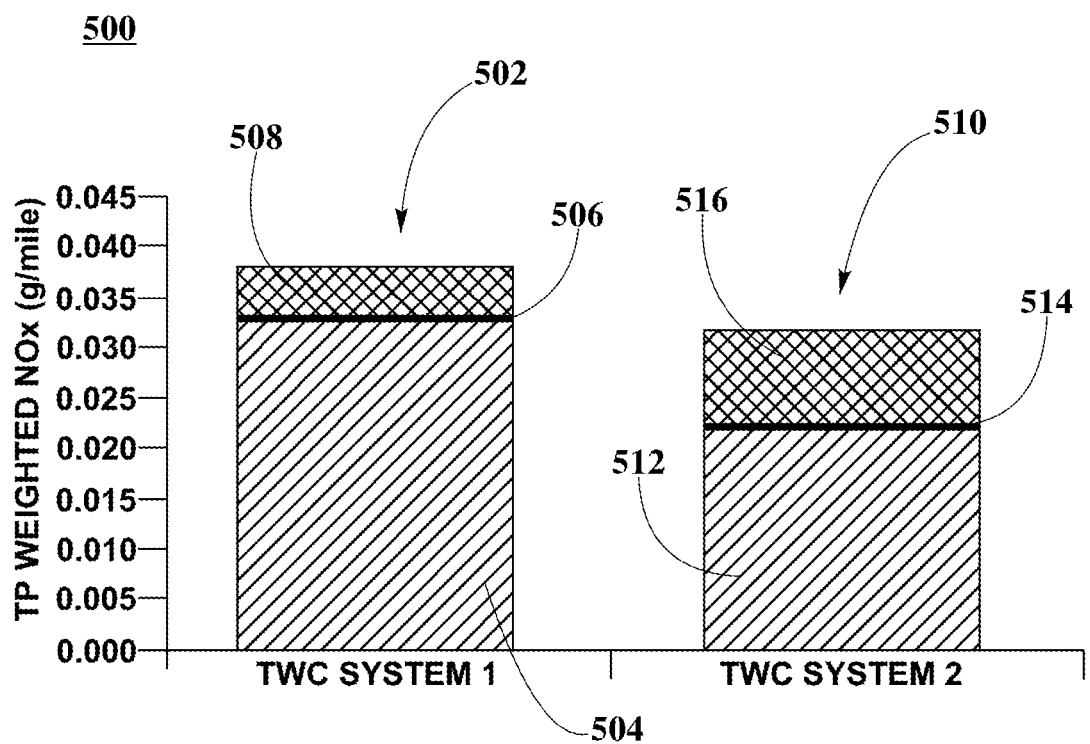
FIG. 5 is a graphical representation illustrating weighted $NO_X$ (g/mile) values at tailpipe for TWC systems 1 and 2 (as described above) employed within a turbo gasoline direct injection (TGDI) engine using FTP-75 test protocol as described in FIG. 4, according to an embodiment.

FIG. 5 is a graphical representation illustrating weighted $NO_X$ (g/mile) values at tailpipe for TWC systems 1 and 2 (as described above) employed within a turbo gasoline direct injection (TGDI) engine using FTP-75 test protocol as described in FIG. 4, according to an embodiment. In FIG. 5, TP weighted $NO_X$ emission 500 includes TWC system 1 TP weighted $NO_X$ 502 and TWC system 2 TP weighted $NO_X$ 510.

In some embodiments, TWC system 1 TP weighted $NO_X$ 502 includes three specific TP weighted $NO_X$ bars as follows: TP weighted $NO_X$ bar 504, TP weighted $NO_X$ bar 506, and TP weighted NO$_X$ bar 508. In these embodiments, each NO$_X$ bar illustrates the FTP-75 bag results in g/mile of weighted NO$_X$ for cold start phase 402, stabilized phase 404, and hot start phase 406, respectively, obtained when measuring tailpipe NO$_X$ emissions associated with TWC system 1. In other embodiments, TWC system 2 TP NO$_X$ weighted 510 includes three specific TP weighted NO$_X$ bars as follows: TP weighted NO$_X$ bar 512, TP weighted NO$_X$ bar 514, and TP weighted NO$_X$ bar 516. In these embodiments, each NO$_X$ bar illustrates the FTP-75 bag results in g/mile of weighted NO$_X$ for cold start phase 402, estabilized phase 404, and hot start phase 406, respectively, obtained when measuring tailpipe NO$_X$ emissions associated with TWC system 2.

In some embodiments, TP weighted NO$_X$ emissions collected in g/mile during implementation of FTP-75 testing associated with TWC systems 1 and 2 are detailed in Table 3, below. In these embodiments, TWC system 2 includes an SPGM UF Type 1 catalyst that exhibits lower tailpipe (TP) weighted NO$_X$ values as compared to TWC system 1 that includes an OEM UF catalyst. Further to these embodiments, TWC system 2 exhibits higher efficient TP NO$_X$ conversion than TWC system 1. Still further to these embodiments and at the end of cold start phase 402, TWC system 1 exhibits higher TP weighted NO$_X$ values than TWC system 2. In these embodiments and after stabilized phase 404, TWC systems 1 and 2 exhibit substantially similar TP weighted NO$_X$ values. Further to these embodiments and at the end of hot start phase 406, TP weighted NO$_X$ values for TWC system 2 are slightly higher than TP weighted NO$_X$ values for TWC system 1. These results confirm that employing an SPGM UF Type 1 catalyst with about 2 g/ft$^3$ PGM loading is as efficient as employing a high PGM OEM UF catalyst with about 59 g/ft$^3$ PGM loading for NO$_X$ conversion.

TABLE 3

TP weighted NO$_X$ emission values associated with TWC systems 1 and 2, as illustrated in FIG. 5.

| FTP-75 PHASE | TWC SYSTEM | TP WEIGHTED NO$_X$ [g/mile] | ASSOCIATED ELEMENT |
| --- | --- | --- | --- |
| Cold start phase 402 | 1 | 0.033 | 504 |
| Stabilized phase 404 | 1 | 0.001 | 506 |
| Hot start phase 406 | 1 | 0.005 | 508 |
| Cold start phase 402 | 2 | 0.022 | 512 |
| Stabilized phase 404 | 2 | 0.001 | 514 |
| Hot start phase 406 | 2 | 0.009 | 516 |

Figure 6:
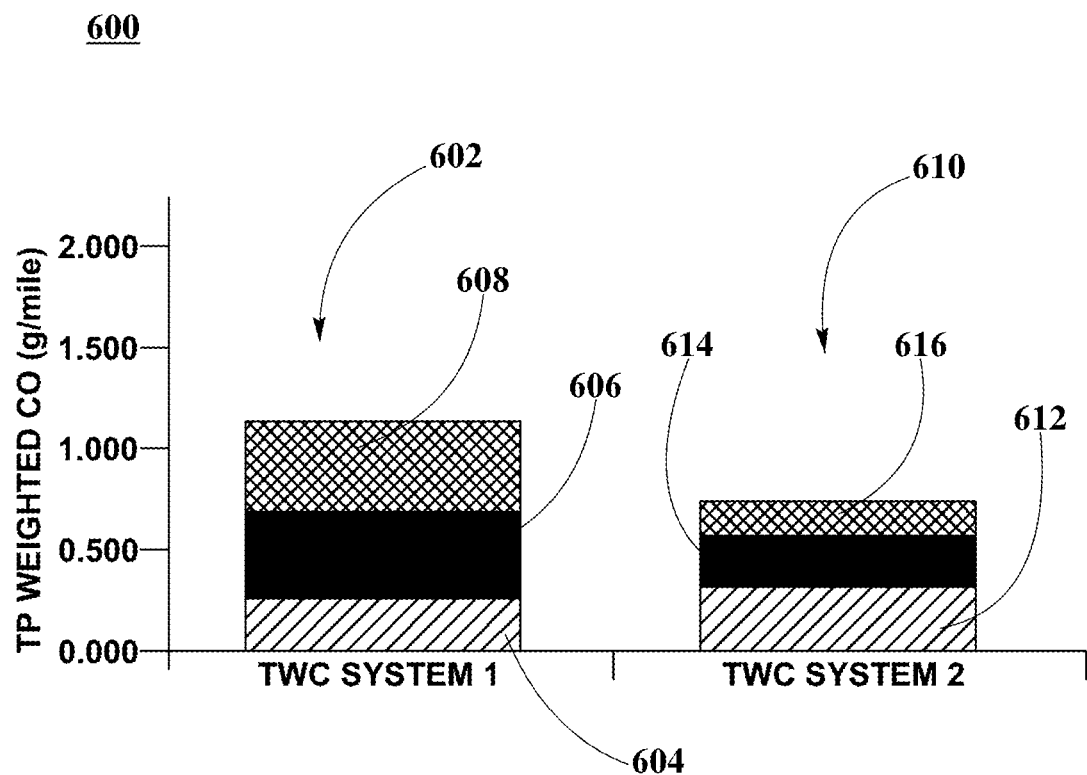
FIG. 6 is a graphical representation illustrating weighted CO (g/mile) values at tailpipe for TWC systems 1 and 2 (as described above) employed within a TGDI engine using FTP-75 test protocol as described in FIG. 4, according to an embodiment.

FIG. 6 is a graphical representation illustrating weighted CO (g/mile) values at tailpipe for TWC systems 1 and 2 (as described above) employed within a TGDI engine using FTP-75 test protocol as described in FIG. 4, according to an embodiment. In FIG. 6, TP weighted CO emission 600 includes TWC system 1 TP weighted CO 602 and TWC system 2 TP weighted CO 610.

In some embodiments, TWC system 1 TP weighted CO 602 includes three specific TP weighted CO bars as follows: TP weighted CO bar 604, TP weighted CO bar 606, and TP weighted CO bar 608. In these embodiments, each CO bar illustrates the FTP-75 bag results in g/mile of weighted CO for cold start phase 402, stabilized phase 404, and hot start phase 406, respectively, obtained when measuring tailpipe CO emissions associated with TWC system 1. In other embodiments, TWC system 2 TP weighted CO 610 includes three specific TP weighted CO bars as follows: TP weighted CO bar 612, TP weighted CO bar 614, and TP weighted CO bar 616. In these embodiments, each CO bar illustrates the FTP-75 bag results in g/mile of weighted CO for cold start phase 402, stabilized phase 404, and hot start phase 406, respectively, obtained when measuring tailpipe CO emissions associated with TWC system 2.

In some embodiments, TP weighted CO emissions collected in g/mile during implementation of FTP-75 testing associated with TWC systems 1 and 2 are detailed in Table 4, below. In these embodiments, TWC system 2 includes an SPGM UF Type 1 catalyst that exhibits overall significant CO conversion and having lower TP weighted CO values as compared to TWC system 1 that includes an OEM UF catalyst. Further to these embodiments and at the end of cold start phase 402, TWC system 2 exhibits higher TP weighted CO values than TWC system 1. Still further to these embodiments and after stabilized phase 404, TWC system 2 exhibits lower TP weighted CO values than TWC system 1. In these embodiments and at the end of hot start phase 406, TP weighted CO values for TWC system 2 are significantly lower than TP weighted CO values for TWC system 1. These results confirm that employing an SPGM UF Type 1 catalyst with about 2 g/ft$^3$ PGM loading is as efficient as employing a high PGM OEM UF catalyst with about 59 g/ft$^3$ PGM loading for CO conversion.

TABLE 4

TP weighted CO emission values associated with TWC systems 1 and 2, as illustrated in FIG. 6.

| FTP-75 PHASE | TWC SYSTEM | TP WEIGHTED CO [g/mile] | ASSOCIATED ELEMENT |
| --- | --- | --- | --- |
| Cold start phase 402 | 1 | 0.270 | 604 |
| Stabilized phase 404 | 1 | 0.441 | 606 |
| Hot start phase 406 | 1 | 0.458 | 608 |
| Cold start phase 402 | 2 | 0.325 | 612 |
| Stabilized phase 404 | 2 | 0.260 | 614 |
| Hot start phase 406 | 2 | 0.180 | 616 |

Figure 7:
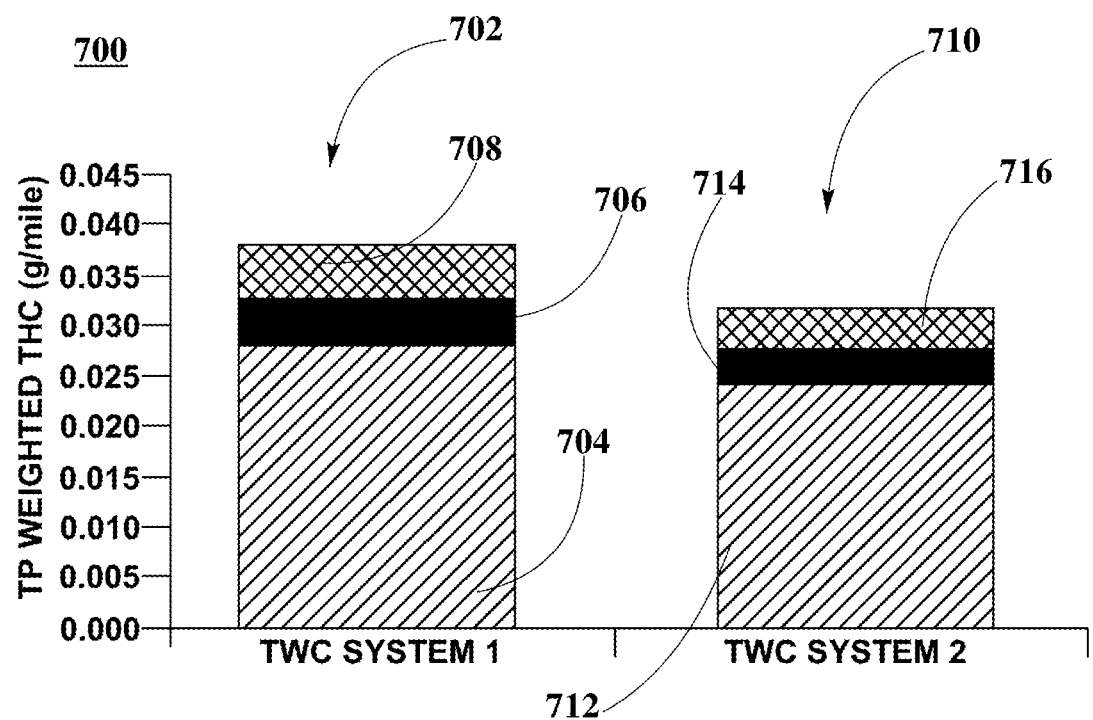
FIG. 7 is a graphical representation illustrating weighted THC (g/mile) values at tailpipe for TWC systems 1 and 2 (as described above) employed within a TGDI engine using FTP-75 test protocol as described in FIG. 4, according to an embodiment.

FIG. 7 is a graphical representation illustrating weighted THC (g/mile) values at tailpipe for TWC systems 1 and 2 (as described above) employed within a TGDI engine using FTP-75 test protocol as described in FIG. 4, according to an embodiment. In FIG. 7, TP weighted THC emission 700 includes TWC system 1 TP weighted THC 702 and TWC system 2 TP weighted THC 710.

In some embodiments, TWC system 1 TP weighted THC 702 includes three specific TP weighted THC bars as follows: TP weighted THC bar 704, TP weighted THC bar 706, and TP weighted THC bar 708. In these embodiments, each THC bar illustrates the FTP-75 bag results in g/mile of weighted THC for cold start phase 402, stabilized phase 404, and hot start phase 406, respectively, obtained when measuring tailpipe THC emissions associated with TWC system 1. In other embodiments, TWC system 2 TP weighted THC 710 includes three specific TP weighted THC bars as follows: TP weighted THC bar 712, TP weighted THC bar 714, and TP weighted THC bar 716. In these embodiments, each THC bar illustrates the FTP-75 bag results in g/mile of weighted THC for cold start phase 402, stabilized phase 404, and hot start phase 406, respectively, obtained when measuring tailpipe THC emissions associated with TWC system 2.

In some embodiments, TP weighted THC emissions collected in g/mile during implementation of FTP-75 testing associated with TWC systems 1 and 2 are detailed in Table 5, below. In these embodiments, TWC system 2 includes an SPGM UF Type 1 catalyst that exhibits lower TP weighted THC values as compared to TWC system 1 that includes an OEM UF catalyst. Further to these embodiments and at the end of cold start phase 402, TWC system 2 exhibits lower TP weighted THC values than TWC system 1. Still further to these embodiments and after stabilized phase 404, TWC system 2 exhibits a slightly lower TP weighted THC values than TWC system 1. In these embodiments and at the end of hot start phase 406, TP weighted THC values for TWC system 2 is slightly lower than TP weighted THC values for TWC system 1. These results confirm that employing an SPGM UF Type 1 catalyst with about 2 g/ft$^3$ PGM loading is as efficient as employing a high PGM OEM UF catalyst with about 59 g/ft$^3$ PGM loading for THC conversion.

TABLE 5

TP weighted THC emission values associated with TWC systems 1 and 2, as illustrated in FIG. 7.

| FTP-75 PHASE | TWC SYSTEM | TP WEIGHTED THC [g/mile] | ASSOCIATED ELEMENT |
|---|---|---|---|
| Cold start phase 402 | 1 | 0.028 | 704 |
| Stabilized phase 404 | 1 | 0.005 | 706 |
| Hot start phase 406 | 1 | 0.005 | 708 |
| Cold start phase 402 | 2 | 0.024 | 712 |
| Stabilized phase 404 | 2 | 0.004 | 714 |
| Hot start phase 406 | 2 | 0.004 | 716 |

In summary, the catalytic behavior exhibited by TWC system 2 during each one of the FTP-75 phases confirms significant $NO_X$, CO and THC conversion performance as effectively as employing a high PGM-based TWC system 1 catalyst. The improved conversion performance in case of TWC system 2 is enabled by SPGM UF Type 1 catalyst, which includes a ZPGM WC layer comprising Cu—Mn binary spinel and doped $Al_2O_3$—$ZrO_2$ and a PGM OC layer having PGM loadings of about 1 g/ft$^3$ Pt and about 1 g/ft$^3$ Rh and doped alumina.

Figure 8:
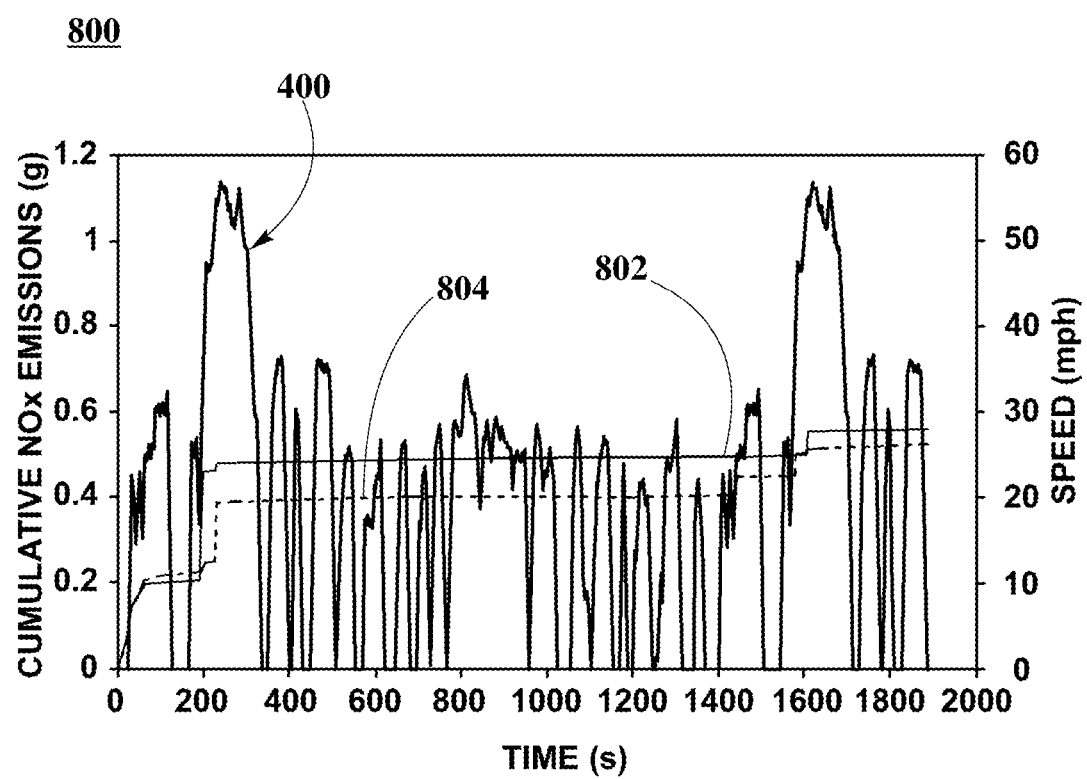
FIG. 8 is a graphical representation illustrating cumulative tailpipe $NO_X$ emission results for TWC systems 1 and 2

FIG. 8 is a graphical representation illustrating cumulative tailpipe $NO_X$ emission results for TWC systems 1 and 2 (as described above), and employing a TGDI engine at given speeds, according to an embodiment. In FIG. 8, cumulative $NO_X$ values comparison 800 includes cumulative $NO_X$ curve 802, cumulative $NO_X$ curve 804, and FTP-75 protocol 400. In FIG. 8, elements having substantially similar element numbers from previous figures function in a substantially similar manner.

In some embodiments, cumulative $NO_X$ curve 802 illustrates cumulative $NO_X$ emission results obtained at tailpipe (TP) associated with TWC system 1 at given speeds. In these embodiments, cumulative $NO_X$ curve 804 illustrates cumulative $NO_X$ emission results obtained at TP associated with TWC system 2 at given speeds.

In some embodiments, the results are obtained during the implementation of Federal Test Procedure (FTP-75) protocol, FTP-75 protocol 400 as described in FIG. 4, for TWC systems 1 and 2. In these embodiments, the results for each of the TWC systems are compared to assess improvements in conversion efficiency and performance of the TWC system including SPGM UF catalyst. Further to these embodiments, the synergistic effects of the aforementioned SPGM UF Type 1 catalyst on $NO_X$ are verified. In these embodiments, verification of the synergistic effects is conducted by comparing the cumulative grams of $NO_X$, for the TWC systems 1 and 2, measured downstream at the tailpipe section of the engine exhaust system including the TGDI engine, as previously described above, at given speeds.

In some embodiments, cumulative TP $NO_X$ values (cumulative $NO_X$ curve 804) associated with TWC system 2 are significantly lower than cumulative TP $NO_X$ values (cumulative $NO_X$ curve 802) associated with TWC system 1. In these embodiments, the improvement in $NO_X$ tailpipe emission (cumulative $NO_X$ curve 804) indicates SPGM UF Type 1catalyst exhibits greater functionality when compared to an OEM PGM UF catalyst. Further to these embodiments, the spinel oxide ZPGM layer within the SPGM UF Type 1 catalyst increased functionality to the PGM layer, thereby lowering $NO_X$ tailpipe emission values associated with TWC system 2. In summary, TWC system 2 exhibits higher $NO_X$ conversion efficiency than TWC system 1.

FIG. 9 is a graphical representation illustrating cumulative tailpipe THC emission results for TWC systems 1 and 2 (as described above), and employing a TGDI engine at given speeds, according to an embodiment. In FIG. 9, cumulative THC values comparison 900 includes cumulative THC curve 902, cumulative THC curve 904, and FTP-75 protocol 400. In FIG. 9, elements having substantially similar element numbers from previous figures function in a substantially similar manner.

In some embodiments, cumulative THC curve 902 illustrates cumulative THC emission results obtained at tailpipe (TP) associated with TWC system 1 at given speeds. In these embodiments, cumulative THC curve 904 illustrates cumulative THC emission results obtained at TP associated with TWC system 2 at given speeds.

In some embodiments, the results measured are obtained during the implementation of Federal Test Procedure (FTP-75) protocol, FTP-75 protocol 400 as described in FIG. 4, for TWC systems 1 and 2. In these embodiments, the results for each of the TWC systems are compared to assess improvements in conversion efficiency and performance of the TWC system including SPGM UF catalyst. Further to these embodiments, the synergistic effects of the aforementioned SPGM UF Type 1 catalyst on THC are verified. In these embodiments, verification of the synergistic effects is conducted by comparing the cumulative grams of THC, for the TWC systems 1 and 2, measured downstream at the tailpipe section of the engine exhaust system including the TGDI engine, as previously described above, at given speeds.

In some embodiments, cumulative TP THC values (cumulative THC curve 904) associated with TWC system 2 are substantially lower than cumulative TP THC values (cumulative THC curve 902) associated with TWC system 1. In these embodiments, TWC system 2 is more efficient than TWC system 1 in terms of overall THC conversion. Further to these embodiments, the replacement of the OEM UF catalyst with the SPGM UF Type 1 catalyst provides such improvements.

Tailpipe Weighted Emission Bag Results from FTP-75 Test—PI Engine

FIG. 10 is a graphical representation illustrating weighted $NO_X$ (g/mile) values at tailpipe for TWC systems 3 and 4 (as described above) employed within a naturally aspirated port injection (PI) engine using FTP-75 test protocol as described in FIG. 4, according to an embodiment. In FIG. 10, TP weighted $NO_X$ 1000 includes TWC system 3 TP weighted $NO_X$ 1002 and TWC system 4 TP weighted $NO_X$ 1010.

In some embodiments, TWC system 3 TP weighted $NO_X$ 1002 includes three specific TP weighted $NO_X$ bars as follows: TP weighted $NO_X$ bar 1004, TP weighted $NO_X$ bar 1006, and TP weighted $NO_X$ bar 1008. In these embodiments, each $NO_X$ bar illustrates the FTP-75 bag results in g/mile of weighted $NO_X$ for cold start phase 402, stabilized phase 404, and hot start phase 406, respectively, obtained when measuring tailpipe $NO_X$ emissions associated with TWC system 3. In other embodiments, TWC system 4 TP weighted $NO_X$ 1010 includes three specific TP weighted $NO_X$ bars as follows: TP weighted $NO_X$ bar 1012, TP weighted $NO_X$ bar 1014, and TP weighted $NO_X$ bar 1016. In these embodiments, each $NO_X$ bar illustrates the FTP-75 bag results in g/mile of weighted $NO_X$ for cold start phase 402, stabilized phase 404, and hot start phase 406, respectively, obtained when measuring tailpipe $NO_X$ emissions associated with TWC system 4.

In some embodiments, TP weighted $NO_X$ emission collected in g/mile during implementation of FTP-75 testing associated with TWC systems 3 and 4 are detailed in Table 6, below. In these embodiments, TWC system 4 includes an SPGM UF Type 3 catalyst that exhibits lower tailpipe (TP) weighted $NO_X$ values as compared to TWC system 3 that includes an SPGM UF Type 2 catalyst. Further to these embodiments and at the end of cold start phase 402, TWC system 4 exhibits lower TP weighted $NO_X$ values than TWC system 3. Still further to these embodiments and after stabilized phase 404, TWC systems 4 exhibit slightly lower TP weighted $NO_X$ values than TWC system 3. In these embodiments and at the end of hot start phase 406, TP weighted $NO_X$ values for TWC system 4 are significantly lower than TP weighted $NO_X$ values for TWC system 3. These results confirm that employing an SPGM UF catalyst including Cu—Co—Mn spinel and low PGM loadings is an effective SPGM UF catalyst. Further, SPGM UF Type 3 catalyst having a total 10 g/ft$^3$ PGM is more efficient than SPGM UF Type 2 catalyst having a total 2 g/ft$^3$ PGM for $NO_X$ conversion.

TABLE 6

TP weighted $NO_X$ emission values associated with TWC systems 3 and 4, as illustrated in FIG. 10.

| ETP-75 PHASE | TWC SYSTEM | TP WEIGHTED $NO_X$ [g/mile] | ASSOCIATED ELEMENT |
|---|---|---|---|
| Cold start phase 402 | 3 | 0.028 | 1004 |
| Stabilized phase 404 | 3 | 0.008 | 1006 |
| Hot start phase 406 | 3 | 0.013 | 1008 |
| Cold start phase 402 | 4 | 0.021 | 1012 |
| Stabilized phase 404 | 4 | 0.005 | 1014 |
| Hot start phase 406 | 4 | 0.007 | 1016 |

FIG. 11 is a graphical representation illustrating weighted CO (g/mile) values at tailpipe for TWC systems 3 and 4 (as described above) employed within a PI engine using FTP-75 test protocol as described in FIG. 4, according to an embodiment. In FIG. 11, TP weighted CO emission 1100 includes TWC system 3 TP weighted CO 1102 and TWC system 4 TP weighted CO 1110.

In some embodiments, TWC system 3 TP weighted CO 1102 includes three specific TP weighted CO bars as follows: TP weighted CO bar 1104, TP weighted CO bar 1106, and TP weighted CO bar 1108. In these embodiments, each CO bar illustrates the FTP-75 bag results in g/mile of weighted CO for cold start phase 402, stabilized phase 404, and hot start phase 406, respectively, obtained when measuring tailpipe CO emissions associated with TWC system 3. In other embodiments, TWC system 4 TP weighted CO 1110 includes three specific TP weighted CO bars as follows: TP weighted CO bar 1112, TP weighted CO bar 1114, and TP weighted CO bar 1116. In these embodiments, each CO bar illustrates the FTP-75 bag results in g/mile of weighted CO for cold start phase 402, stabilized phase 404, and hot start phase 406, respectively, obtained when measuring tailpipe CO emissions associated with TWC system 4.

In some embodiments, TP weighted CO emissions collected in g/mile during implementation of FTP-75 testing associated with TWC systems 3 and 4 are detailed in Table 7, below. In these embodiments, TWC system 4 that includes an SPGM UF Type 3 catalyst and TWC system 3 that includes an SPGM UF Type 2 catalyst exhibit substantially similar CO conversion. Further to these embodiments and at the end of cold start phase 402, TWC system 4 exhibits higher TP weighted CO values than TWC system 3. In these embodiments and after stabilized phase 404 and hot start phase 406, TWC systems 3 and 4 exhibit substantially similar TP weighted CO values.

TABLE 7

TP weighted CO emission values associated with TWC systems 3 and 4, as illustrated in FIG. 11.

| FTP-75 PHASE | TWC SYSTEM | TP WEIGHTED CO [g/mile] | ASSOCIATED ELEMENT |
|---|---|---|---|
| Cold start phase 402 | 3 | 0.170 | 1104 |
| Stabilized phase 404 | 3 | 0.012 | 1106 |
| Hot start phase 406 | 3 | 0.043 | 1108 |
| Cold start phase 402 | 4 | 0.211 | 1112 |
| Stabilized phase 404 | 4 | 0.012 | 1114 |
| Hot start phase 406 | 4 | 0.043 | 1116 |

FIG. 12 is a graphical representation illustrating weighted THC (g/mile) values at tailpipe for TWC systems 3 and 4 (as described above) employed within a PI engine using FTP-75 test protocol as described in FIG. 4, according to an embodiment. In FIG. 12, TP weighted THC emission 1200 includes TWC system 3 TP weighted THC 1202 and TWC system 4 TP weighted THC 1210.

In some embodiments, TWC system 3 TP weighted THC 1202 includes three specific TP weighted THC bars as follows: TP THC weighted bar 1204, TP THC weighted bar 1206, and TP THC weighted bar 1208. In these embodiments, each THC bar illustrates the FTP-75 bag results in g/mile of weighted THC for cold start phase 402, stabilized phase 404, and hot start phase 406, respectively, obtained when measuring tailpipe THC emissions associated with TWC system 3. In other embodiments, TWC system 4 TP weighted THC 1210 includes three specific TP weighted THC bars as follows: TP THC weighted bar 1212, TP THC weighted bar 1214, and TP THC weighted bar 1216. In these embodiments, each THC bar illustrates the FTP-75 bag results in g/mile of weighted THC for cold start phase 402, stabilized phase 404, and hot start phase 406, respectively, obtained when measuring tailpipe THC emissions associated with TWC system 4.

In some embodiments, TP weighted THC emissions collected in g/mile during implementation of FTP-75 testing associated with TWC systems 3 and 4 are detailed in Table 8, below. In these embodiments, TWC system 4 that includes an SPGM UF Type 3 catalyst and TWC system 3 that includes an SPGM UF Type 2 catalyst exhibit substantially similar THC conversion. Further to these embodiments and at the end of cold start phase 402, TWC system 4 exhibits slightly higher TP weighted THC values than TWC system 3. Still further to these embodiments and after stabilized phase 404 and hot start phase 406, TWC systems 3 and 4 exhibit substantially similar TP weighted THC values.

TABLE 8

TP weighted THC emission values associated with TWC systems 3 and 4, as illustrated in FIG. 12.

| FTP-75 PHASE | TWC SYSTEM | TP WEIGHTED THC [g/mile] | ASSOCIATED ELEMENT |
|---|---|---|---|
| Cold start phase 402 | 3 | 0.024 | 1204 |
| Stabilized phase 404 | 3 | 0.014 | 1206 |
| Hot start phase 406 | 3 | 0.014 | 1208 |
| Cold start phase 402 | 4 | 0.028 | 1212 |
| Stabilized phase 404 | 4 | 0.013 | 1214 |
| Hot start phase 406 | 4 | 0.013 | 1216 |

In summary, the catalytic behavior exhibited by TWC systems 3 and 4 during each one of the FTP-75 phases confirms that substantially similar THC conversion is enabled by SPGM UF Type 2 and 3 catalysts. Increasing PGM loading from about 2 g/ft$^3$ PGM within SPGM UF Type 2 catalyst to about 10 g/ft$^3$ PGM within SPGM UF Type 3 catalyst does not exhibit a significant change in overall efficiency of SPGM UF catalyst.

FIG. 13 is a graphical representation illustrating cumulative tailpipe NO$_X$ emission results for TWC systems 3 and 4 (as described above), and employing a PI engine at given speeds, according to an embodiment. In FIG. 13, cumulative NO$_X$ values comparison 1300 includes cumulative NO$_X$ curve 1302 and cumulative NO$_X$ curve 1304, and FTP-75 protocol 400. In FIG. 13, elements having substantially similar element numbers from previous figures function in a substantially similar manner.

In some embodiments, cumulative NO$_X$ curve 1302 illustrates cumulative NO$_X$ emission results obtained at tailpipe (TP) associated with TWC system 3 at given speeds. In these embodiments, cumulative NO$_X$ curve 1304 illustrates cumulative NO$_X$ emission results obtained at TP associated with TWC system 4 at given speeds.

In some embodiments, the results are obtained during the implementation of Federal Test Procedure (FTP-75) protocol, FTP-75 protocol 400 as described in FIG. 4, for TWC systems 3 and 4. In these embodiments, the results for each of the TWC systems are compared to assess improvements in conversion efficiency and performance of the TWC system including SPGM UF catalysts. Further to these embodiments, the synergistic effects of the aforementioned SPGM UF Type 2 and 3 catalysts on NO$_X$ are verified. In these embodiments, the verification of the synergistic effects is conducted by comparing the cumulative grams of NO$_X$, for the TWC systems 3 and 4, respectively, measured downstream at tailpipe section of the engine exhaust system including the PI engine, as previously described above, at given speeds.

In some embodiments, cumulative TP NO$_X$ values (cumulative NO$_X$ curve 1302) associated with TWC system 3 are higher than cumulative TP NO$_X$ values (cumulative NO$_X$ curve 1304) associated with TWC system 4. In these embodiments, SPGM UF Type 3 catalyst within TWC system 4 exhibits higher NO$_X$ conversion efficiency when compared to a SPGM UF Type 2 catalyst within TWC system 3.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A catalytic system for treating an exhaust stream of a combustion engine, comprising
 a combustion engine;
 a close-coupled catalytic converter configured to accept at least one exhaust gas stream from said combustion engine, the close-coupled catalytic converter comprising a platinum group metal catalyst, wherein the platinum group metal loading is from about 90 to 110 g/ft$^3$; and
 an underfloor catalytic converter downstream of, and, in fluid communication with said close-coupled catalytic converter, the underfloor catalytic converter comprising a synergized platinum group metal catalyst comprising a spinel catalyst composition comprising a binary spinel having the general formula A$_X$B$_{3-X}$O$_4$ wherein X is from 0.01 to 2.99, and A and B are selected from the group consisting of sodium, potassium, calcium, barium, zinc, cadmium, aluminum, magnesium, manganese, nickel, copper, cobalt, iron, chromium, titanium, cerium, strontium, lanthanum, praseodymium, neodymium, samarium, indium, and mixtures thereof, and a platinum group metal catalyst, wherein the platinum group metal catalyst of the underfloor catalytic converter has a concentration of about 1 g/ft$^3$ to about 10g/ft$^3$.

2. The catalytic system of claim 1, wherein the binary spinel comprises a Cu—Mn spinel.

3. The catalytic system of claim 2, wherein the Cu—Mn spinel comprise Cu$_{1.5}$Mn$_{1.5}$O$_4$.

4. The catalytic system of claim 1, wherein the spinel catalyst composition comprises at least one substrate, and a catalyst composition comprising a spinel oxide having the formula A$_X$B$_Y$M$_{3-X-Y}$ where X is from about 0.01 to about 1.99 and Y is from about 0.01 to about 1.0, and wherein A, B, and M are different from each other, and are selected from the group consisting of sodium, potassium, calcium, barium, zinc, cadmium, aluminum, magnesium, manganese, nickel, copper, cobalt, iron, chromium, titanium, cerium, strontium, lanthanum, praseodymium, neodymium, samarium, indium, and mixtures thereof.

5. The catalytic system of claim 4, wherein the spinel oxide has the formula Cu$_X$Co$_Y$Mn$_{3-X-Y}$O$_4$ where X is from about 0.01 to about 1.99 and Y is from about 0.01 to about 1.0.

6. The catalytic system of claim 5, wherein X is about 1 and Y is about 1.

7. The catalytic system of claim 1, wherein the platinum group metal catalyst of the synergized platinum group metal catalyst is free of rare earth metals and oxygen storage materials.

* * * * *